US006040040A

United States Patent [19]

Rainbow

[11] Patent Number: 6,040,040

[45] Date of Patent: Mar. 21, 2000

[54] MULTI-LAYER THERMAL TRANSFER MEDIA FROM SELECTIVELY CURABLE FORMULATIONS

[75] Inventor: David J. Rainbow, Centerville, Ohio

[73] Assignee: NCR Corporation, Dayton, Ohio

[21] Appl. No.: 09/014,473

[22] Filed: Jan. 28, 1998

[51] Int. Cl.[7] .......... B23B 7/02

[52] U.S. Cl. .......... 428/212; 428/195; 428/413; 428/423.1; 428/484; 428/500; 428/913; 428/914; 427/146; 427/152; 427/331; 427/372.2

[58] Field of Search .......... 428/195, 211, 428/913, 914, 212, 413, 423.1, 484, 500; 430/138, 203, 253, 259, 330; 427/146, 152, 331, 372.2

[56] References Cited

U.S. PATENT DOCUMENTS

| | | | |
|---|---|---|---|
| 3,663,278 | 5/1972 | Blose et al. . | |
| 4,258,367 | 3/1981 | Mansukhani . | |
| 4,315,643 | 2/1982 | Tokunaga et al. . | |
| 4,403,224 | 9/1983 | Wirnowski . | |
| 4,523,207 | 6/1985 | Lewis et al. . | |
| 4,628,000 | 12/1986 | Talvalkar et al. . | |
| 4,680,368 | 7/1987 | Nakamoto et al. . | |
| 4,687,701 | 8/1987 | Knirsch et al. . | |
| 4,698,268 | 10/1987 | Ueyama . | |
| 4,707,395 | 11/1987 | Ueyama et al. . | |
| 4,777,079 | 10/1988 | Nagamoto et al. . | |
| 4,778,729 | 10/1988 | Mizobuchi . | |
| 4,865,901 | 9/1989 | Ohno et al. . | |
| 4,869,941 | 9/1989 | Ohki . | |
| 4,894,283 | 1/1990 | Wehr . | |
| 4,923,749 | 5/1990 | Talvalkar . | |
| 4,948,694 | 8/1990 | Ohkuma et al. | 430/138 |
| 4,950,696 | 8/1990 | Palazotto et al. . | |
| 4,975,332 | 12/1990 | Shini et al. . | |
| 4,983,446 | 1/1991 | Taniguchi et al. . | |
| 4,988,563 | 1/1991 | Wehr . | |
| 5,128,308 | 7/1992 | Talvalkar . | |
| 5,200,438 | 4/1993 | Fujii et al. . | |
| 5,240,626 | 8/1993 | Thakur et al. . | |
| 5,240,781 | 8/1993 | Obata et al. . | |
| 5,248,652 | 9/1993 | Talvalkar . | |
| 5,266,447 | 11/1993 | Takahashi et al. . | |
| 5,270,368 | 12/1993 | Lent et al. . | |
| 5,348,348 | 9/1994 | Hanada et al. . | |
| 5,391,685 | 2/1995 | Hitomi et al. . | |
| 5,437,964 | 8/1995 | Lapin et al. . | |
| 5,500,040 | 3/1996 | Fujinami . | |
| 5,567,506 | 10/1996 | Sogabe . | |
| 5,573,885 | 11/1996 | Inui et al. | 430/138 |
| 5,641,346 | 6/1997 | Mantell et al. . | |

*Primary Examiner*—Bruce H. Hess
*Assistant Examiner*—Michael E. Grendzynski
*Attorney, Agent, or Firm*—Millen White Zelano & Branigan, PC

[57] ABSTRACT

A thermal transfer medium with widely variable properties is obtained through the use of a thermosoftenable coating with regions or layers with distinct viscosity values and hot tack properties. The top surface of the coating has a high concentration of polymers obtained from selectively curable monomers and the bottom surface of the coating has a high concentration of uncured monomers which are selectively curable. The top surface of the coating provides high adhesion to a receiving substrate and the bottom surface of the coating provides reduced adhesion to the supporting substrate of the thermal transfer medium. This allows for rapid transfer and high adhesion to a receiving substrate. Selected thermal transfer media will form images on rough stock and/or will form images with high speed printers. Methods for preparing such thermal transfer media comprise forming a coating containing selectively curable monomers and/or oligomers on a flexible supporting substrate and curing a portion of selectively curable monomers at the top surface of the coating to form polymers, preferably by exposure to visible or UV light.

27 Claims, 2 Drawing Sheets

MULTI-LAYER THERMAL TRANSFER MEDIA FROM SELECTIVELY CURABLE FORMULATIONS

FIELD OF THE INVENTION

The present invention relates to thermal transfer printing technology wherein data or images are produced on a receiving substrate by selectively transferring portions of a pigmented layer from a donor film to the receiving substrate by heating extremely precise areas with heating elements typically comprised of thin film resistors. More particularly, the present invention relates to thermal transfer printing with multi-layer ribbons, wherein the viscosity and adhesive properties of the layers are distinct. These multi-layer ribbons also enable greater variation in the properties and performance of the print obtained from conventional thermal transfer printing processes and equipment since the requirements of the transferred print are shared between two layers. For example, multi-layer ribbons are advantageously used to provide print on rough stock and with high speed printers such as "near edge", "true edge", "corner edge" or "Fethr™" thermal transfer printers wherein the thin film resistors (heating elements) are positioned right at the edge of the thermal print head allowing rapid separation of the donor film from the receiving substrate after the thin film resistors are fired.

BACKGROUND OF THE INVENTION

Thermal transfer printing is widely used in special applications such as in the printing of machine readable bar codes, either on labels or directly on articles to be encoded. The thermal transfer process employed by these printing methods provides great flexibility in generating images allowing for broad variations in the style, size and color of the printed images, typically from a single machine with a single thermal print head.

Representative documentation in the area of multi-layer thermal transfer printing includes the following patents:

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,523,207, issued to M. W. Lewis et al. on Jun. 11, 1985, discloses a multiple copy thermal record sheet which uses crystal violet lactone and a phenolic resin.

U.S. Pat. No. 4,698,268, issued to S. Ueyama on Oct. 6, 1987, discloses a heat resistant substrate and a heat-sensitive transferring ink layer. An overcoat layer may be formed on the ink layer.

U.S. Pat. No. 4,707,395, issued to S. Ueyama et al. on Nov. 17, 1987, discloses a substrate, a heat-sensitive releasing layer, a coloring agent layer, and a heat-sensitive cohesive layer.

U.S. Pat. No. 4,778,729, issued to A. Mizobuchi on Oct. 18, 1988, discloses a heat transfer sheet comprising a hot melt ink layer on one surface of a film and a filing layer laminated on the ink layer.

U.S. Pat. No. 4,869,941, issued to Ohki on Sep. 26, 1989, discloses an imaged substrate with a protective layer laminated on the imaged surface.

U.S. Pat. No. 4,894,283, issued to Wehr on Jan. 16, 1990, discloses a reusable thermal transfer ribbon with a functional layer and a binding layer containing 100% ethylene vinyl acetate copolymer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

U.S. Pat. No. 5,240,781, issued to Obata et al. on Aug. 31, 1993, discloses an ink ribbon for thermal transfer printers having an ink layer with viscosity, softening and solidifying characteristics said to provide clear images on rough paper even with high speed printers.

U.S. Pat. No. 5,567,506, issued to Sogabe on Oct. 22, 1996, discloses a thermal ribbon having a release layer with a melt viscosity below 1000 cps and colored ink layer with a high melt viscosity.

The coating formulations which provide thermal transfer ribbons vary widely. Representative documentation in this area includes the following patents:

U.S. Pat. No. 3,663,278, issued to J. H. Blose et al. on May 16, 1972, which discloses a thermal transfer medium having a coating composition of cellulosic polymer, thermoplastic resin, plasticizer and a "sensible" material such as a dye or pigment.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,865,901, issued to Ohno et al. on Sep. 12, 1989, discloses a thermal transfer printing ribbon with an ink layer comprising a blend of ethylene-vinyl acetate copolymer and a viscous resin as a binder with correction/erasability capabilities.

U.S. Pat. No. 4,983,446, issued to Taniguchi et al. on Jan. 8, 1991, describes a thermal image transfer recording medium which comprises as a main component, a saturated linear polyester resin.

Ultraviolet radiation curable inks are known and most comprise a reactive oligomer, a reactive monomer, a photoinitiator, a pigment and optional additives. UV curable inks are commonly used in printing methods other than thermal transfer printing, such as screen printing, and lithography techniques for printed circuit boards, examples being described in U.S. Pat. Nos. 5,200,438; 5,391,685; 5,270, 368; 4,680,368 and 5,500,040. UV curable inks said to be suitable for ink jet printing are described in U.S. Pat. Nos. 4,258,367 and 5,641,346. Conventional UV curable inks typically do not have the transfer properties necessary for use in conventional thermal transfer printing processes with conventional thermal transfer printers after cure. They are typically formulated for use in printing methods wherein curing provides a permanent image.

To be suitable for thermal transfer printing, there are many requirements placed on conventional general purpose thermal transfer media and the coating formulations which produce them. For example, the properties of the thermal transfer layer must permit transfer from a carrier to a receiving substrate and provide a stable, preferably permanent image. The release properties and adhesive properties needed to meet these requirements are in conflict and typically require a mixture of components to address both needs. As the use of thermal transfer printing grows into new applications, the requirements for the ribbons become broader and more strict. For example, when printing on rough stock, very high adhesive properties are required from the transferred image since only a portion of the image may contact high spots on the substrate surface. Conventional general purpose ribbons with a single layer often cannot meet these requirements. Two separate layers are typically needed to provide the required release properties and adhesive properties. Applying two separate layers to form the thermal transfer medium significantly adds to the cost of manufacture. It is desirable to prepare thermal transfer media which will form images on rough stock and does not require the application of two separate layers for their production.

Conventional general purpose ribbons with a single layer also cannot meet the requirements of high speed printers known in the art as "near edge", "true edge" and "Fethr™" printers, referred to herein collectively as "high speed printers", due to the rapid separation of the ribbon from the substrate once the print head heating elements have been fired. Since the ribbon and receiving substrate are separated almost instantaneously after the thin film resistors are fired, there is very little time for waxes and/or resins to melt/soften and flow onto the surface of the receiving substrate before the ribbon is separated from the receiving substrate. With conventional single ink layer ribbons, the ink layer is usually split and the transfer incomplete, resulting in light printed images. Two separate layers are typically needed to provide the required release properties and adhesive properties. Applying two separate layers to form the thermal transfer medium significantly adds to the cost of manufacture. It is desirable to prepare thermal transfer media which will form images with a high speed printer and do not require the application of two separate layers for their production.

In another aspect of thermal transfer printing, extensive work has been done to develop water-rich systems to replace organic solvent-based systems. Water-based and water-rich coating formulations improve safety, reduce costs, and simplify compliance with environmental regulations and restrictions. For example, U.S. Pat. No. 4,923,749 issued to Talvalkar, discloses a thermal transfer ribbon which comprises a thermal sensitive layer and protective layer, both of which are water-based. It is desirable to prepare thermal transfer layers from a coating formulation which does not require any solvent, whether aqueous or organic.

SUMMARY OF THE INVENTION

A general objective of this invention is the improvement of thermal transfer media used in thermal transfer printing and the simplification and improvement of methods for their production, particularly the thermal transfer media used in thermal transfer printing on rough receiving substrates.

A specific object of this invention is to provide a thermal transfer medium with a layer or region which contains polymers of selectively cured monomers as a binder and a layer or region which contains uncured monomers that are selectively curable.

Another object of the present invention is to provide a method for preparing thermal transfer media wherein a single coating is applied to a flexible supporting substrate of a thermal transfer medium and multiple layers or regions are formed by selectively curing a portion of this coating.

A further object of the present invention is to provide a thermal transfer printer which incorporates a thermal transfer medium of the present invention.

Additional objects and advantages of the present invention will become apparent and further understood from the detailed description and claims which follow, together with the annexed drawings.

The above objects are achieved through the thermal transfer media, methods of preparing thermal transfer media and thermal transfer printers of the present invention.

The thermal transfer media of the present invention transfer images to receiving substrates when exposed to the operating print head of a thermal transfer printer. These thermal transfer media comprise:

(a) a flexible supporting substrate; and (b) a thermosoftenable coating composition positioned on this flexible supporting substrate. The thermosoftenable coating comprises a sensible material such as a coloring agent; uncured monomers, oligomers or a combination thereof which are selectively curable; and polymers of these selectively curable monomers and/or oligomers. The thermosoftenable coating preferably also comprises at least one wax and/or at least one thermoplastic binder resin. The thermosoftenable coating has a high concentration of polymers of the selectively curable monomers and/or oligomers at the top surface and a high concentration of selectively curable monomers and/or oligomers at the bottom surface which contacts the flexible supporting substrate. This is accomplished by initiating cure of the selectively curable monomers and/or oligomers at the top surface of the coating. The polymers of the selectively curable monomers and/or oligomers have a melt viscosity value higher than that of the uncured monomers and/or oligomers. This provides regions or layers within the coating which have distinct melt viscosity values and hot tack properties. With lower melt viscosity comes lower cohesion within the coating, which eases separation of the transferred and untransferred portions of the coating on the flexible supporting substrate of the thermal transfer medium. With higher hot tack properties, adhesion to the receiving substrate is improved.

The thermal transfer printers of the present invention incorporate a thermal transfer medium of the present invention, as described above.

The methods for preparing thermal transfer media provided by this invention comprise first applying a liquid coating formulation to a flexible supporting substrate to form a liquid coating thereon. The liquid coating formulation comprises: a sensible material, an uncured monomer and/or oligomer which is selectively curable, a wax and/or a thermoplastic binder resin and optionally a solvent. The liquid coating is then either cooled to form a solid coating or dried to remove solvent and form a solid coating. The top surface of the solid coating is treated to initiate cure of the selectively curable monomers and/or oligomers at the top surface of the solid coating. The selectively curable monomers and oligomers include those wherein polymerization is initiated by exposure to air, moisture, ultra violet light, visible light and/or electron beam radiation.

Photopolymerizable monomers and oligomers suited for use in this invention include those which cure by a cationic mechanism and those which cure by a free radical mechanism.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED SUMMARY OF THE INVENTION

Figure 1:
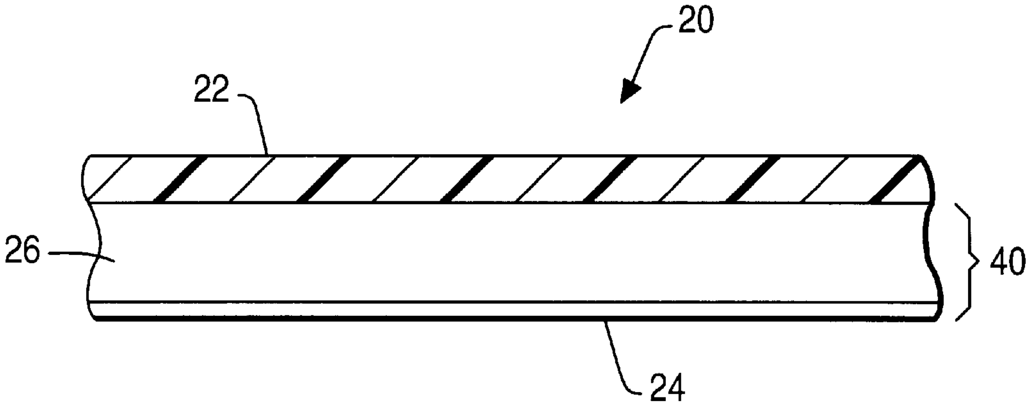
FIG. 1 demonstrates a thermal transfer medium of the prevent invention prior to thermal transfer.
Figure 2:
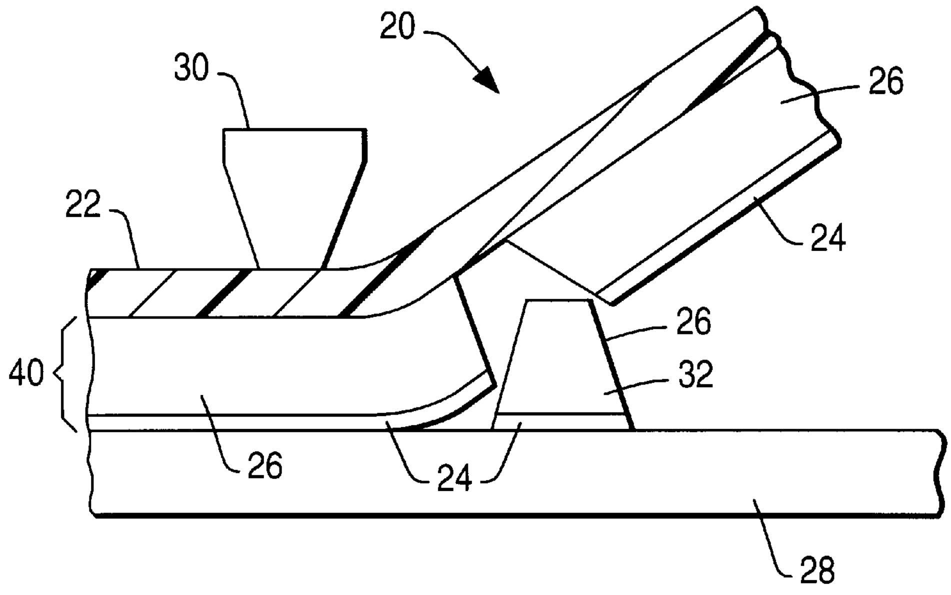
FIG. 2 demonstrates a thermal transfer medium of FIG. 1 in the process of forming an image by thermal transfer.

Thermal transfer ribbon 20, as illustrated in FIGS. 1 and 2 is a preferred embodiment of this invention comprising a substrate 22 of a flexible material, preferably a thin smooth paper or plastic-like material. Suitable substrate materials include tissue type paper materials such as 30–40 gauge capacitor tissue, manufactured by Glatz and polyester-type plastic materials such as 14–35 gauge polyester film manufactured by Dupont under the trademark Mylar®. Polyethylene naphthalate films, polyethylene terephthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 10 microns. If desired, the substrate or base film may be provided with a backcoating on the surface opposite the thermal transfer layer. Tissue-type paper materials or polyester type plastic materials (polyethylene terephthalate) are preferred.

Positioned on substrate 22 is a thermosoftenable coating 40 which comprises a layer 24 and layer 26. Both layers comprise a sensible material, e.g., a pigment, and preferably one or more waxes and/or one or more thermoplastic binder resins. Layer 26 additionally contains uncured monomers and/or oligomers which are selectively curable and layer 24 additionally contains polymers of these selectively curable monomers and/or oligomers. The melt viscosity and thermal sensitivity of layer 26 and layer 24 are determined by the melting points of the monomers, oligomers, polymers, thermoplastic binder resins and waxes therein and the amounts thereof in each. Layer 24 has a melt viscosity at least two times higher than that of layer 26 because of the additional polymers therein. Preferably the melt viscosity value for layer 24 is over 25 times higher than that of layer 26 where the thermal transfer ribbon is to be used in high speed printers. For printing on rough receiving substrates, the melt viscosity value for layer 24 is preferably at least 10 times higher than the melt viscosity value for layer 26.

The melt viscosity of the uncured layer (or region) of the thermosoftenable coating can preferably range from 25–1500 mPas at 150° C. at a shear rate of 100 l/s (Haake RS150 rheometer). The melt viscosity of the cured layer (or region) preferably falls within the range of 1,500 to 30,000 mPas measured at 150° C. at a shear rate of 100 l/s (Haake RS 150 Rheometer).

With lower melt viscosity values comes lower cohesion within the coating. Low cohesion allows for easier separation from the substrate. Reduced melt viscosity and cohesion ensure that exposure to heat from the thermal transfer head 30 will transfer both the layer 26 and layer 24 to a receiving substrate 28 without splitting layer 26 or separating layer 24 and layer 26 upon transfer, so as to form a multiple layer image 32. High melt viscosity values and cohesion are often accompanied by improved adhesion of the transferred image to the receiving substrate, particularly rough stock, through the high hot tack properties, as well as high resistance to scratch and smear.

Hot tack properties can be manifested and quantified by peel strength determinations wherein the adhesive strength of the cured and uncured layers (or regions) to a paper substrate is determined using a device such as an Instron 9411 as described in detail in the examples below. The cured layers have a peel strength at least 2 times greater than the uncured layers, preferably 10 times greater. It is generally desirable to formulate the thermosoftenable coating to have cured layers (or regions) with a peel strength at least 2 times greater than the peel strength of the single layer of a general purpose thermal transfer ribbon, and uncured layers (or regions) with a peel strength less than the peel strength of the single coating from a general purpose thermal transfer ribbon.

Low softening points for layer 26 aid in the simultaneous transfer of layer 24 and 26. Layer 26 and layer 24 preferably have softening points below 200° C. typically below 150° C. and most preferably about 75° C. Such softening temperatures enable the thermal transfer medium to be used in high speed thermal transfer printers such as "near edge," "true edge" and "Fethr™" thermal transfer printers, wherein the thermal transfer ribbon is separated from the receiving substrate almost spontaneously with the firing of the heating elements within the thermal print head. These heating elements (thin film resistors) are believed to operate at temperatures within the range of 100° C. to 300° C. The actual operating temperatures are difficult to determine due to the small size of the heating elements.

A unique feature of the thermal transfer ribbons of the present invention is the differentiation in composition within a single coating. Polymers of selectively curable monomers and/or oligomers are concentrated at the top surface of the coating with uncured monomers and/or oligomers concentrated at the bottom of the coating at the surface in contact with the flexible supporting substrate. The concentration of the polymers is preferably sufficiently high to provide cured regions within the coating at the top surface and uncured regions at the bottom of the coating. The cured regions and uncured regions can be sufficiently defined to provide distinct layers, one being an uncured layer and the other being a cured layer or patterns on the top surface of the thermosoftenable coating. The present invention also includes embodiments wherein the concentration of polymers decreases gradually from the top surface of the coating to the bottom without forming a definable layer.

Melt viscosity values, cohesion and hot tack properties are distinct for portions of this thermosoftenable coating due to differentiation in the composition of this single coating. These distinct properties simplify separation of the coating from the flexible supporting substrate of the thermal transfer medium while providing high adhesion to the receiving substrate. These features provide unique performance for a single coating thermal transfer medium.

The thermosoftenable coating of the thermal transfer medium of this invention contains at least one sensible material in the uncured regions or layers and also in the cured regions or layers of the thermosoftenable coating, in essentially the same amounts, since they are derived from the same coating formulation. Essentially any sensible material used in thermal transfer printing can be employed in the thermal transfer medium of this invention. These include sensible materials which can be sensed by optical, visual, magnetic means, electroconductive means or by photoelectric means. The most common sensible materials are coloring agents such as pigments or dyes and magnetic pigments (e.g., iron oxide). Carbon black is the most common coloring agent. Preferred carbon blacks provide thermal transfer media which develop little or no static during use within the thermal transfer medium. Less common coloring agents include those described in U.S. Pat. No. 3,663,278, leuco dyes which can react with phenolic resins to generate color, phthalocyanine dyes, fluorescent naphthalimide dyes, cadmium, primrose, chrome yellow, ultra marine blue, titanium dioxide, zinc oxide, iron oxide, cobalt oxide and nickel oxide.

Suitable magnetic pigments include iron oxides and ferrofluids which render printed image recognizable by magnetic ink character recognition (MICR) devices. Suitable ferrofluids comprise suspensions/dispersions/emulsions of magnetic particles, i.e., iron oxide particles such as Magnetite ($Fe_3O_4$), coated with a hydrophilic coating. Specific examples of suitable ferrofluids include those disclosed by Thakur et al. in U.S. Pat. No. 5,240,626, which are colloidal suspensions of magnetic particles (iron oxide/Magnetite-$Fe_3O_4$), coated with a carboxy functional polymer as an anti-agglomerating agent and preferably dispersed with the aid of a surfactant pair or surfactant and dispersant. Suitable ferrofluids are available commercially from sources such as Georgia Pacific Corp. The preferred sizes for these magnetic particles range from 20–200 Å, most preferably 20–90 Å.

Sensible materials other than coloring agents and magnetic pigments used in specialized applications include photochromic dyes, photochromic pigments and fluorescent pigments, which are water-soluble, dispersible or emulsifiable. Examples of suitable photochromic compounds are found in U.S. Pat. No. 5,266,447.

The thermosoftenable coatings of the thermal transfer media of this invention preferably contain a thermoplastic binder resin and/or wax. These components serve to provide stability and resiliency to the coating when prepared on the flexible supporting substrate and also contribute to the adhesive properties, resiliency and flexibility of the printed image. The cured regions/layers and uncured regions/layers within the coating contain the same wax and thermoplastic binder resin in the same amounts since they are derived from the same coating formulation.

Preferably, the thermoplastic binder resins are very tacky, i.e., have high hot tack properties, and when softened, provide an adhesive strength measured as peel strength with an Instron 4411 of at least 2 times that of a general purpose ribbon as described in the examples herein. This provides higher adhesion of the coating to a receiving substrate both during transfer and after transfer by a thermal print head. Suitable thermoplastic binder resins with high hot tack properties include polyesters, acrylic acid-ethylene-vinyl acetate terpolymers, methacrylic acid-ethylene-vinyl acetate terpolymers, polyvinyl acetate, vinylchloride-vinyl acetate copolymers, ethylene-vinylacetate copolymers, ethylene-ethylacetate copolymers, styrene copolymers, styrene butadiene block copolymers, polyurethane resins, ethylene-alkyl (meth)acrylate copolymers, and styrene-alkyl(meth)acrylate copolymers.

Other thermoplastic binder resins which may be employed include those conventionally employed in thermal transfer media such as those described in U.S. Pat. Nos. 5,240,781 and 5,348,348. These include polyvinylchloride, polyethylene, polypropylene, polyethylene oxide, ethylene-propylene rubber, polyvinyl alcohol, polylactones, polyketone resin, polystyrene, ethylene-propylene copolymers, ethylcellulose, polyamide, epoxy resin, xylene resin, polyvinylbutyryl, styrene-butadiene rubber, nitrile rubber, acrylic rubber, rosin esters and sucrose benzoate.

The thermoplastic binder resins employed preferably have a softening temperature of from 50° C. to 250° C. and are typically used as small particles, preferably of submicron size, within dispersions or emulsions or alternatively in solvent solutions.

The coating may contain more than one thermoplastic binder resin to provide a specific property profile. For example, Piccotexp™ 100 resin by Hercules is a styrene copolymer (vinyl toluene-methylstyrene copolymer) that provides high hot tack properties that can be used separately or blended with aqueous ethylene-vinylacetate copolymer dispersions and aqueous polyester resin dispersions.

The thermoplastic binder resins may optionally be reactive such that they crosslink or react with the uncured monomer or oligomer in the thermosoftenable coating when exposed to curing conditions for the uncured monomer or oligomer.

Preferred waxes are those within conventional solvent or water-based wax emulsions or dispersions. Examples include natural waxes such as carnauba wax, rice bran wax, bees wax and candelilla wax. Other suitable waxes include petroleum waxes such as paraffin waxes and synthetic hydrocarbon waxes such as low molecular weight polyethylene and Fisher-Tropsch wax. Less common waxes which are suitable are higher fatty acids such as myristic acid, palmitic acid, stearic acid and behenic acid; higher aliphatic alcohols such as stearyl alcohol and esters such as sucrose fatty acid esters. Mixtures of waxes are also suitable. The preferred waxes include carnauba wax, montan wax, candelilla wax, paraffin waxes and low molecular weight polyethylene.

The wax-like substances preferably have a melting point of from 35° C. to 250° C., more preferably 50° C. to 140° C. The waxes are differentiated by their softening/melting point. Hard waxes such as carnauba wax, synthetic waxes and montan wax have high softening/melting points and as such, greater resiliency. A particular example of a hard wax is carnauba wax provided by Shamrock Technologies in Newark, N.J. under the tradename "S-Nauba". Another is "Carnauba North Country No. 3" by Baldini & Co., Inc. of Milburn, N.J. In contrast, soft waxes such as candelilla wax provided by Stahl & Pitch of West Babylon, N.Y., and paraffin waxes have low melting/softening points and provide greater temperature sensitivity and flexibility. A blend of hard and soft wax is often preferred. Hard waxes typically have a melting point within the range of 80° C.–250° C. and soft waxes typically have a melting/ softening point within the range of 40° C.–80° C.

The thermosoftenable coating may contain a plasticizer to enhance flexibility and reduce the softening point. Plasticizers used in conventional thermal transfer ribbons such as those described in U.S. Pat. No. 3,663,278 are suitable. These can include adipic acid esters, phthalic acid esters, chlorinated biphenyls, citrates, epoxides, glycerols, glycols, hydrocarbons, chlorinated hydrocarbons, phosphates, and the like. The thermosoftenable coating may contain other optional additives to enhance such properties as flexibility (oil flexibilizers), hot tack properties, cohesion, weatherability (U.V. absorbers), melt viscosity (fillers) and smoothness.

Conventional fillers, emulsifiers, dispersants, surfactants, defoaming agents, flow adjusters, leveling agents or photostabilizers may be present when used to aid formation of the thermosoftenable coating provided they will not interfere with the cure of the selectively curable monomers. For example, basic materials with a pH above 8.0 can quench the cations needed for cationic polymerization. Illustrative examples of flow adjusters are low molecular weight organopolysiloxanes such as methylpolysiloxanes which may be used in an amount of 0.01–10 wt. % based on weight of the total ink formulation. An illustrative example of a defoamer, i.e., a surfactant, is Anti-Musal JIC, which may be used in an amount of 0.01–10 wt. % based on the weight of the total solids within the thermosoftenable coating. Illustrative examples of leveling agents are low molecular weight polysiloxane/polyether copolymers and modified organic polysiloxanes, which may be used in an amount of 0.01–10 wt. % based-on the weight of solids within the thermosoftenable coating.

If desired, an intermediate layer can be deposited between the flexible supporting substrate and the thermosoftenable layer.

The thermosoftenable coating of the thermal transfer medium of the present invention preferably comprises a loading of sensible material within the range of 0.5–60 wt. %, based on dry components. Preferred loadings of sensible material fall within the range of 5–25 wt. %. The thermosoftenable coating of the thermal transfer medium of the present invention preferably also comprises 5 wt. % wax and above, more preferably 10 to 60 wt. % wax based on total solids. The amount of thermoplastic binder resin employed preferably comprises 3 wt. % and above, more preferably 5–50 wt. % of the thermosoftenable coating based on total solids. The amount of sensible material, wax and thermoplastic binder resin in the cured and uncured layers or regions of the thermosoftenable coating is essentially the same.

The "selectively curable monomers and oligomers" used in the present invention are those which can be cured (polymerized) by a reaction mechanism which can be controlled both in its initiation and duration. This includes monomers or oligomers which are cured by exposure to heat, moisture, air, UV radiation, visible light and/or electron beam radiation. Preferred thermally curable monomers and oligomers include epoxies and vinyl ethers. Preferred photopolymerizable monomers and oligomers include epoxies, vinyl ethers, acrylates, methacrylates, acrylic acids and methacrylic acids. Air curable monomers and oligomers include the precursors to EPDM elastomers. Moisture curable monomers and oligomers include epoxies and those combinations of diisocyanates and diols which form polyurethanes. The type of cure will often be determined by polymerization initiators.

Photopolymerization, particular UV curing, provides more accurate control over the extent of cure of the uncured monomers and oligomers within the thermosoftenable coating. The depth of cure at the surface of the coating is limited, particularly for pigmented coatings, due to limited penetration of UV light and visible light.

Photopolymerizable monomers and oligomers which are suitable for use in this invention can be liquid at ambient temperature and polymerize by either a cationic mechanism or free-radical mechanism or both to form a thermoplastic polymer which softens and flows when exposed to a temperature at or below 300° C.

Cationically photopolymerizable monomers and oligomers include those selected from the group consisting of epoxies, vinyl ethers, cyclic ethers, cyclic thioethers and vinyl functional hydrocarbons. The epoxy monomers and oligomers have at least one oxirane moiety of the formula

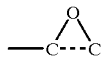

The epoxies are particularly preferred monomers and oligomers used in the present invention.

Other cyclic ethers suitable for use in the present invention include butylene oxides with structural units of the formula:

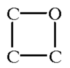

pentylene oxides with structural units of the formula:

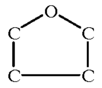

thiopropylenes with structural units of the formula:

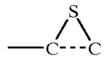

1,3,5-trioxanes with structural units of the formula:

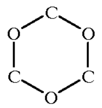

hexyl lactones with structural units of the formula:

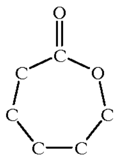

and 1,4,6,9-tetraoxaesperononanes with structural units of the formula:

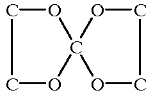

Other particularly preferred cationically photopolymerizable monomers and oligomers are the vinyl ether monomers and oligomers.

Conventional vinyl ether monomers and oligomers which have at least one vinyl ether group —O—CR'═CRH, wherein R and R' are each, independently, H or $C_{1-8}$-alkyl, are suitable. Suitable vinyl ether monomers and oligomers vary widely in structure and performance. Those with vinyl ether groups where both R and R'═H are preferred. Epoxy monomers and oligomers and vinyl ether monomers and oligomers with two or more reactive groups can be used to increase crosslinking. Mixtures of epoxy and vinyl ether monomers and oligomers may also be used.

Specific examples of suitable epoxy monomers and oligomers include the "1,2-cyclic ethers" disclosed in U.S. Pat. No. 5,437,964 and those described in *Ring-Opening Polymerizations,* Vol. 2, by Frisch and Reegan, Marcel Dekker, Inc. (1969). Suitable epoxies are aliphatic, cycloaliphatic, aromatic or heterocyclic and will typically have an epoxy equivalency of from 1 to 6, preferably 1 to 3. Suitable examples include propylene oxide, styrene oxide, vinylcyclohexene oxide, vinylcyclohexene dioxide, glycidol, butadiene oxide, diglycidyl ether of bisphenol A, oxetane, octylene oxide, phenyl glycidyl ether, 1,2-butane oxide, cyclohexeneoxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)-adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, epoxy silicones, e.g., dimethylsiloxanes having cycloaliphatic epoxide or glycidyl ether groups, aliphatic epoxy modified with propylene glycol and dipentene dioxide.

A wide variety of commercial epoxy resins are available and listed in *Handbook of Epoxy Resins* by Lee and Neville, McGraw Hill Book Company, New York (1967) and in *Epoxy Resin Technology* by P. f. Bruins, John Wiley & Sons, New York (1968).

Preferred epoxies include:

(1) monofunctional epoxy monomers/oligomers such as epoxy grafted polyesters (Vikopol 24, Vikopol 26 by Elf Atochem), cycloaliphatic monoepoxies, such as those of the formulae

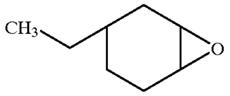

and

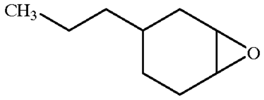

and mixtures of cycloaliphatic monoepoxies available from Union Carbide under the trade name UVR 6100 having an epoxy equivalent weight of 130 to 140, limonene monoxide, epoxidized alpha olefins of the formula

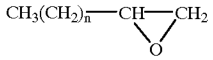

when n=1–30$^+$, silicone epoxy oligomers, alpha pinene oxide, and the like;

(2) bifunctional monomers such as limonene dioxide, bisphenol-A epoxy, cycloaliphatic diepoxides such as bis(3,4-epoxycyclohexyl)adipate of formula (a)

(a)

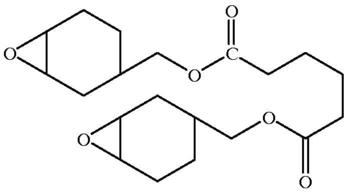

and 3,4epoxycyclohexylmethyl-3,4-epoxycyclohexane carboxylate (commercially available from Union Carbide under the trade name Cyracure® and from Sartomer under the trade name Sarcat® of formula (b)

(b)

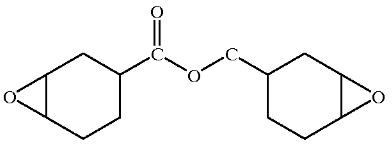

and the like; and (3) polyfunctional monomers such as those of general formula (c), including epoxidized polybutene, epoxidized soybean oil, linseed fatty acid esters and the like.

(c)

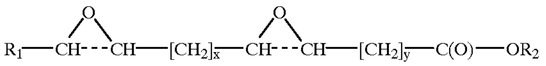

Vinyl Ether Monomers

Examples of suitable monomers and oligomers having at least one or more vinyl ether groups include those disclosed in U.S. Pat. No. 4,950,696 and those of the following general formula:

$$(RCH{=}CR'{-}O{-}Z'{)_n}{-}B$$

where

R and R' are each, independently H or $C_{1-8}$ alkyl,

Z' is a direct bond or a divalent moiety having $C_{1-20}$ carbon atoms selected from the group consisting of alkylene, cycloalkylene, or polyalkylene ether moieties, n is an integer from 1 to 4, B is hydrogen or a moiety derived from aromatic and aliphatic hydrocarbons, alcohols, cycloaliphatic hydrocarbons, esters, ethers, siloxanes, urethanes, and carbonates, of from 1 to 40 carbon atoms.

Monofunctional monomers are those which have n=1, while the multifunctional monomers are those which have n=2 to 4.

Suitable vinyl ether monomers can also be defined by the following specific formulae:

a) Vinyl ether terminated aliphatic monomers of the formula $$M_2\text{—}(\text{—}(OZ)_m\text{—}OCR'{=}CHR)_n$$

where n is 1 to 4, m is 0 to 5, and $M_2$ is a mono, di, tri, or tetra functional aliphatic or cycloaliphatic moiety having from 4–40 carbon atoms;

Z is a divalent moiety having $C_{1\text{-}20}$ carbon atoms selected from the group consisting of alkylene, cycloalkylene or polyalkylene moieties, and R and R' are each, independently, H or $C_{1\text{-}8}$ alkyl.

Preferred are mono and difunctional vinyl ethers based on normal alkanes having the general formula:

$$CHR{=}CR'\text{—}O(CH_2)_y\text{—}R'',$$

wherein y=1 to 18

R=—H, or $C_{1\text{-}8}$ alkyl

R'=—H, or $C_{1\text{-}8}$ alkyl

R"=—H, —OH, or —O—CR'=CHR;

mono and difunctional vinyl ethers based on ethylene glycol having the general formula:

$$CHR{=}CR'\text{—}(OCH_2CH_2)_y\text{—}R'',$$

wherein y=1 to 6 and

R, R' and R" are as defined above; and mono and difunctional vinyl ethers based on 1,3-propanediol and 1,4-butanediol having the general formula:

$$CHR{=}CR'\text{—}(O(CH_2)_x)_y\text{—}R'',$$

wherein x=3 or 4 y=1 to 6 and

R, R' and R" are as defined above.

b) Vinyl ether terminated ester monomers of the formula $$M_1\text{—}(C(O)\text{—}O\text{—}Z\text{—}O\text{—}CR'{=}CHR)_n$$

where n is 1 to 4, $M_1$ is a mono, di, tri, or tetra functional moiety having from 1–15 carbon atoms selected from the group consisting of alkylene, arylene, aralkylene and cycloalkylene moieties, Z is a divalent moiety having $C_{1\text{-}20}$ carbon atoms selected from the group consisting of alkylene, cycloalkylene, or polyalkylene ether moieties, R and R' are each, independently, a monovalent moiety selected from the group consisting of H and alkyl groups having 1–8 carbon atoms.

c) Vinyl ether terminated ether monomers derived from ether compounds such as HO—$[CH_2CH_2O]_m$H, wherein m is 2–5.

d) Vinyl ether terminated aromatic monomers of the formula $$M_3\text{—}(OZ\text{—}OCR'{=}CHR)_n$$

where n is 1 to 4, and $M_3$ is a mono, di, tri, or tetrafunctional aromatic moiety having 6 to 40 carbon atoms; and Z, R' and R" are as defined above.

e) Vinyl ether terminated siloxane monomers of the formula $$(RCH{=}CR'O\text{—}Z')_n\text{—}A,$$

wherein

A is a polysiloxane with from 4 to 15 silicon atoms;

n=1–4 and

R, R' and Z' are as defined above.

f) Vinyl ether terminated carbonate monomers of the formula $$X\text{—}(O\text{—}C(O)\text{—}O)_p\text{—}(OZ\text{—}OCR'{=}CHR)_n,$$

wherein x is a diester, diol or polyol moiety of from 2 to 20 carbon atoms, n is 1–4, p is 0 to 3, and R, R' and Z are as defined above.

Specific vinyl ethers which are suitable include a) bisphenol A derivatives and other aromatic vinyl ethers of the formulae (1) and (2):

(1)

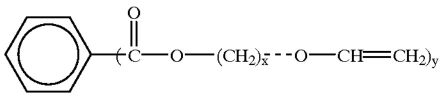

where x is 2 or 4, y is 2 or 3;

(2)

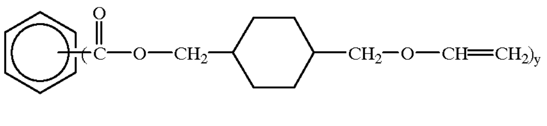

where y is 2 b) ester derived divinyl ethers of the formulae (3) and (4):

$$CH_2{=}CH{-}O{-}(CH_2)_y{-}O{-}C(O){-}(CH_2)_x{-}C(O){-}O{-}(CH_2)_y{-}O{-}CH{=}CH_2 \quad (3)$$

where x is 2, 3, or 4, y is 2 or 4; and (4)

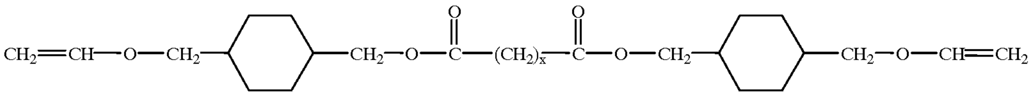

where x is 2, 3, or 4 c) cycloaliphatic diol derived vinyl ethers of formula (5):

(5)

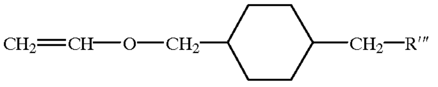

wherein R''' is H, OH or O—CH=$CH_2$, d) poly ether derived vinyl ethers of the formulae (6) and (7):

(6)

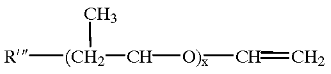

where x is 2, 3, or 4 and

R''' is H, OH or —O—CH=$CH_2$, $$CH_3CH_2{-}C(CH_2{-}O{-}CH_2CH_2O{-}CH{=}CH_2)_3 \quad (7)$$

and e) phenol derived vinyl ethers of the formulae (8) and (9)

(8)

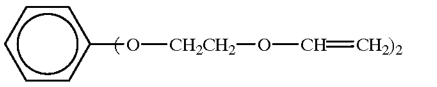

(9)

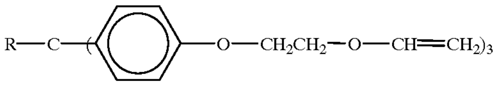

where R is H or $CH_3$.

Common vinyl ether monomers which are suitable include ethyl vinyl ether, propyl vinyl ether, isobutyl vinyl ether, octadecyl vinyl ether, hydroxybutyl vinyl ether, propenyl ether of propylene carbonate, dodecyl vinyl ether, cyclohexyl vinyl ether, 2-ethylhexyl vinyl ether, butyl vinyl ether, ethyleneglycol monovinyl ether, diethyleneglycol divinyl ether, butanediol monovinyl ether, butane diol divinyl ether, hexane diol divinyl ether, ethylene glycol butyl vinyl ether, triethylene glycol methyl vinyl ether, cyclohexane dimethanol monovinyl ether, cyclohexane dimethanol divinyl ether, 2-ethylhexyl vinyl ether, poly-THF divinyl ether, CRH=CR—$[O(CH_2)_4—O]_n$—CR=CRH, pluriol-E-200-vinyl ether, CRH=CR—$[O—CH_2—CH_2]_n$—O—CR=CRH and the like.

As indicated above, photopolymerizable monomers and oligomers which polymerize by a free radical cure can also be used in the coating formulations of the present invention. The monomers and oligomers which polymerize by free radical polymerization are typically sensitive to light such that exposure to ambient light must be avoided when preparing the thermal transfer ribbons herein. Examples of suitable free-radical photopolymerizing monomers and oligomers include acrylate monomers, methacrylate monomers, acrylic acids, methacrylic acids, epoxy acrylates and epoxy methacrylates. This is commonly referred to as a dual cure mechanism. Other dual cure systems, i.e., UV and thermal, are also suitable where the thermal cure is provided by separate components.

The acrylates, methacrylates, acrylic acids and methacrylic acids have at least one functional group that conforms to the general formula B below:

B

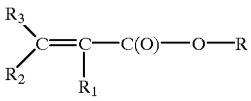

wherein R, $R_1$, $R_2$ and $R_3$=H or a hydrocarbon based radical. The acrylates and methacrylates ($R_1$=a hydrocarbon based radical) are preferred over the acrylic acids and methacrylic acids®=H). Preferred acrylates are methyl methacrylate and ethyl methacrylate monomers. Hydrocarbon based radicals of R and $R^1$ include methyl, ethyl, propyl, isopropyl, n-butyl, sec-butyl, isobutyl, tert-butyl, hexyl, heptyl, 2-heptyl, 2-ethylhexyl, 2-ethylbutyl, dodecyl, hexadecyl, 2-ethoxyethyl, isobornyl and cyclohexyl. The preferred acrylates are those wherein R and $R^1$ are selected from the $C_1$–$C_6$ series and $R^2$ is H. Monomers with two or more functional groups of formula B can also be used as well as the following oligomers: acrylated amines, polyester acrylates, urethane acrylates, polyether acrylates and acrylated polybutadiene. Other monomers having unsaturated carbon-carbon double bonds can be used in a minor portion with the acrylic acids, acrylates, methacrylates and methacrylic acids. These include styrene, vinyl acetate, vinyl chloride, vinylidene chloride, butadiene, isoprene, propylene, vinyl alcohol and the like.

The starting of any photochemical reaction is the absorption of a photon by a compound which promotes it to an excited state, followed by the decomposition of the compound to a highly reactive entity. Compounds which ultimately form protic acids or Br nsted-Lawry acids upon exposure to UV and/or visible light sufficient to initiate cationic polymerization are suitable for use as photoinitiators in this invention. Such compounds are commonly referred to as cationic photoinitiators. Most cationic UV photoinitiators absorb photon energy at a wavelength in the range of 360–450 nm. Compounds which form reactive free radicals upon exposure to UV and/or visible light sufficient to initiate free-radical polymerization are also suitable for use as photoinitiators in this invention. Such compounds are commonly referred to as free-radical photoinitiators. Both free-radical photoinitiators and cationic photoinitiators are well known and conventional photoinitiators such as those listed below are suitable for use in this invention.

| Structure | Trade Name | Supplier |
|---|---|---|
| Benzoin | Esacure BO | Fratelli Lamberti |
| | (2-hydroxy-1,2-diphenylethanone) | |
| Benzoin ethyl ether | Daitocure EE | Siber Hegner |
| | (2-Ethoxy-1,2-diphenylethanone) | |
| Benzoin isopropyl ether | Vicure 30 | Stauffer |
| | Daitocure IP | Siber Hegner |
| | 2-Isopropoxy-1,2-diphenylethanone) | |
| Benzoin n-butyl ether | Esacure EB 1 | Fratelli Lamberti |
| | (2-Butoxy-1,2-diphenylethanone) | |
| Mixture of benzoin butyl ethers | Trigonal 14 | Akzo |
| Benzoin iso-butyl ether | Vicure 10 | Stauffer |
| | Esacure EB2 | Fratelli Lamberti |
| | Daitocure IB | Siber Hegner |
| | (2-Isobutoxy-1,2-diphenylethanone) | |
| Blend of benzoin n-butyl ether and benzoin isobutyl ether | Esacure EB3 | |
| | Fratelli Lamberti | |
| | Escure EB4 | |
| Benzildimethyl ketal (BDK) | Irgacure 651 | Ciba-Geigy |
| | Lucirin BDK | BASF |
| | Esacure KB1 | Fratelli Lamberti |
| | Esacure KB60 | Fratelli Lamberti |
| | (60% solution in methylene chloride) | |
| | Micure 3K-6 | Miwon |
| | Hicure BDK | Kawaguchi |
| | (2,2-Dimethoxy-1,2-diphenylethanone) | |
| 2,2-Diethoxy-1,2-diphenylethanone | Ulvatone 8302 | Upjohn |
| ,-Diethoxyacetophenone | DEAP | Upjohn |
| | DEAP | Rahn |
| | (2,2-Diethoxy-1-phenyl-ethanone) | |
| ,-Di-(n-butoxy)-acetophenone | Uvatone 8301 | Upjohn |
| | (2,2-Dibutoxyl-1-phenyl-ethanone) | |
| 1-Hydroxy-cyclohexyl-phenyl keton (HCPK) | Irgacure 184 | Ciba-Geigy |
| ,-dimethoxy- -hydroxy acetophenone | Darocur 1173 | Merck |
| | (from 1.1.92 Ciba-Geigy) | |
| | Micure HP-8 | Miwon |
| | (2-Hydroxy-2-methyl-1-phenyl-propan-1-one) | |
| 1-(4-Isopropylphenyl)-2-hydroxy-2-methyl-propan-1-one | Darocur 1116 | Merck |
| | (from 1.1.92 Ciba-Geigy) | |
| 1-[4-(2-Hydroxyethoxy)phenyl]-2-hydroxy-2-methylpropan-1-one | Darocur 2959 | Merck |
| | (from 1.1.92 Ciba-Geigy) | |
| 1:1 mixture | Irgacure 500 | Ciba-Geigy |
| | Blend of 1-hydroxy-cyclohexyl-phenyl ketone and benzophenone | |
| and other benzophenone derivatives | Darocur 4665 | Merck |
| | (from 1.1.92 Ciba-Geigy | |
| | Blend of 2-hydroxy-2-methyl-1-phenyl-propan-1-one and benzophenone | |
| | Darocur 1664 | Merck |
| | (from 1.1.92 Ciba-Geigy) | |
| | Blend of 2-hydroxy-2-methyl-1-phenyl-propan-1-one and 2-isopropyl thioxanthone) | |
| | Darocur 4043 | Merck |
| | (from 1.1.92 Ciba-Geigy) | |
| | Blend of 2-hydroxy-2-methyl-1-phenyl-propan-1-one | |
| | 2-isopropyl--thioxanthone and 1-(4-dimethyl-aminophenyl)-ethanone | |
| 2-Methyl-1-[4-(methylthio)phenyl]-2-morpholino-propan-1-one | Irgacure 907 | Ciba-Geigy |
| 2-Benzyl-2-dimethylamino-1-(4-morpholino-phenyl)-butan-1-one | Irgacure 369 | Ciba-Geigy |
| 3,6-Bis(2-methyl-2-morpholino-propanonyl)-9-butyl-carbazole | Florcure A-3 | Floridienne |

-continued

| | | |
|---|---|---|
| 75% solution in tripropylene-glycoldiacrylate) Poly[2-hydroxy-2-methyl-1-[4-(1-methylvinyl)-phenyl]propan-1-one | Esacure KIP | Fratelli Lamberti |
| 2,4,6-Trimethylbenzoyl-diphenyl-phosphine oxide | Lucirin TPO | BASF |
| Blends of 2,4,6-Trimethylbenzoyl-diphenyl-phosphine oxide and 2-hydroxy-2-methyl-1-phenyl-propan-1-one | Darocur 4263 (15:85 mixture) Ciba-Geigy) Darocur 4265 (50:50 mixture) | Merck (from 1.1.92 |
| 2,2,2-Trichloro-1-[4-(1,1-dimethylethyl)phenyl]-ethanone | Trigonal P1 | Akzo |
| 2,2-Dichloro-1-(4-phenoxyphenyl)-ethanone | Sandoray 1000 | Sandoz |
| 4,4'-Bis(chloromethyl)-benzophenone | FI-4 | Eastman |
| Phenyl-tribromomethyl-sulphone | BMPS | Seitetsu Kakaku |
| Methyl -oxo-benzeneacetate | Vicure 55 | Stauffer |
| | Nuvopol P1 3000 Rahn | |
| Benzophenone | Benzophenone | |
| Blend of 2,4,6-trimethyl-benzophenone and benzophenone | Esacure TZT | Fratelli Lamberti |
| Blend of 4-methyl-benzophenone and benzophenone | Photocure 81 | Sunko |
| [4-(4-Methylphenylthio)phenyl]phenylmethanone | Quantacure BMS International Bio-Synthetics | |
| 3,3'-Dimethyl-4-methoxy benzophenone | Kayacure MBP | Nippon Kayaku |
| Methyl 2-benzoylbenzoate | Daitocure OB | Siber Hegner |
| 4-Phenyl-benzophenone | Trigonal 12 | Akzo |
| 4,4'-Bis(dimethylamino)-benzophenone | Michler's ketone | |
| Blend of 2-chloro and 4-chlorothioxanthone | Kayacure CTX | Nippon Kayaku |
| Blend of 2-isopropyl- and 4-isopropylthioxanthone | Darocur ITX (2 isomer only) | Merck |
| | Quantacure ITX Synthetics | International Bio- |
| | Lucirin LR 8771 BASF | |
| | Speedcure ITX | Lambsons Ltd. |
| 2,4-Dimethylthioxanthone | Kayacure RTX | Nippon Kayaku |
| 2,4-Diethylthioxanthone | Kayacure DETX Nippon Kayaku | |
| Benzil | Benzil | |
| 1,7,7-Trimethyl-bicyclo[2.2.1]heptane-2,3-dione | Campherquinone | |
| Blend of benzil and 4-phenyl benzophenone | Trigonal P121 | Akzo |
| 4-Benzoyl-N,N,N-trimethylbenzene-methanaminium chloride | Quantacure BTC International Bio-Synthetics | |
| 2-Hydroxy-3-(4-benzoylphenoxy)-N,N,N-trimethyl-1-propanaminium chloride monohydrate | Quantacure BPQ International Bio-Synthetics | |
| 2-Hydroxy-3-(3,4-dimethyl-9-oxo-9H-thioxanthon-2-yloxy)-N,N,N-trimethyl-1-propanminium chloride | Quantacure QIX International Bio-Synthetics | |
| 4-(13-Acryloyl-1,4,7,10,13-pentaoxatridecyl)-benzophenone | Uvecryl P36 | UCB |
| 4-Benzoyl-N,N-dimethyl-N-[2-(1-oxo-2-propenyl)oxyl[ethylbenzenemethanaminium chloride | Quantacure ABQ International Bio-Synthetics | |
| | methyldiethanolamine | |
| | triethanolamine | |
| Ethyl 4-(dimethylamino)benzoate | Quantacure EPD International Bio-Synthetics | |
| | Kayacure EPA | Nippon Kayaku |
| | Nuvopol EMBO | Rahn |
| | Speedcure EDB | Lambsons Ltd. |
| 2-n-Butoxyethyl 4-(dimethylamino)benzoate | Quantacure BEA International Bio-Synthetics | |
| | Speedcure BEDB Lambsons Ltd | |
| Isoacryl 4-(dimethylamino)benzoate | Kayacure DMBI | Nippon Kayaku |
| 2-(dimethylamino)ethyl benzoate | Quantacure DMB International Bio-Synthetics | |
| 1-(4-Dimethylaminophenyl)-ethanone | PPA | Siber Hegner |
| Unsaturated copolymerisable tertiary amines (structures not revealed) | Uvecryl P 101 Uvecryl P 104 Uvecryl P 105 Uvecryl P 115 | UCB Radcure Specialties |
| Copolymerisable amine acrylates (structures not revealed) | Photomer 4116 | Harcros |
| | Photomer 4182 | Harcros |
| | Laromet LR 8812 | BASF |
| Bis($y^5$-cyclopentadienyl)bis[2,6-difluoro-3-(1H-pyrr-1-yl)phenyll-titanium | Irgacure 784 | Ciba-Geigy |

-continued

| Structure | Comments | Tradename | Supplier |
|---|---|---|---|
| | mixture of sulphonium salts (1) | Cyracure UVI-6990 | Union Carbide |
| | mixture of sulphonium salts (2) | Cyracure UVI-6974 | Union Carbide |
| Bis[4-(diphenylsulphonio)-phenyl[sulphide bis-hexafluorophosphate | 30–40% solution in propylene carbonate | Degacure KI 85 | Degussa |
| Bis[4-(diphenylsulphonio)-phenyl]sulphide bis-hexafluorophosphate | 33% solution in propylene carbonate | SP-55 | Asahi Denka |
| Bis[4-(di-(4-(2-hy-droxyethyl)phenyl)-sulphonio-phenyl]sulphide bis-hexafluorophosphate | 27% solution in propylene carbonate | SP-150 | Asahi Denka |
| Bis[4-(di-(4-(2-hydroxyethyl)phenyl)-sulphonio)-phenyl]sulphide bis-hexafluoroantinomate | 60% solution in propylene carbonate | SP-170 | Asahi Denka |
| $^{5}$-2,4-(Cyclopenta-dienyl)[(1,2,3,4,5,6- )-(methylethyl)-benzene]-iron(II)hexafluorophosphate | | Irgacure 261 | Ciba-Geigy |

Other examples of suitable free-radical photoinitiators are described by K. Dietliker in *Chemistry and Technology of UV and EB Formulation for Coatings, Inks & Paints,* Vol. III, Selective Industrial Training Associates Ltd., London, U.K. (1991). Still others include the benzoin derivatives, benzoin ethers, acetophenone derivatives, azo-bis-isobutyronitrile, thioxanones and aromatic ketones of the formula:

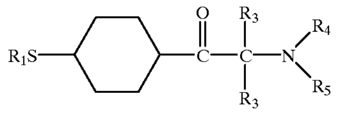

wherein $R_1$–$R_5$ H, $C_1$–$C_{10}$ alkyl and $C_1$–$C_{10}$ aryl, an example being Igracure 907 by Ciba Geigy, described in "Radiation Curing of Polymers", *The Royal Society of Chemistry,* 1987, pp. 184–195.

Examples of suitable cationic photoinitiators are aryldiazonium salts, diaryliodonium salts, triarylsulfonium salts and triarylselenonium salts. Representative formulas are given below.

Aryldiazonium salts of the formula $\overset{+}{Ar}—N_2X^-$,

Diaryliodonium salts of the formulae $\overset{+}{Ar}—I—ArX^-$, including

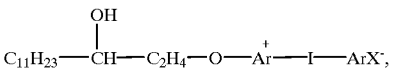

Triarylsulphonium salts of the formulae

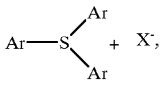

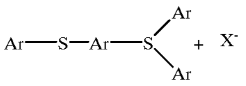

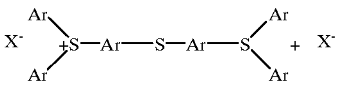

Triarylselenonium salts of the formula

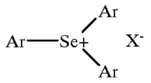

Dialkylphenacylsulphonium salts of the formula

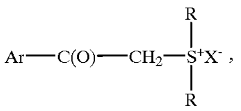

Aryloxydiarylsulphoxonium salts of the formula

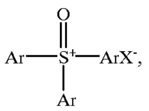

Dialylphenacylsulphoxonium salts of the formula

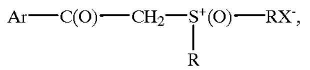

wherein Ar is phenyl or naphthyl, R is a $C_{1-10}$ hydrocarbon based moiety and X is a counter ion, typically $SbF_6^-$, $AsF_6^-$, $PF_6^-$ or $BF_6^-$. Other suitable cationic photoinitiators include iron arene complexes (Igracure™ 261 by Ciba Geigy), nitrobenzyl triarylsilyl ethers, triarylsilyl peroxides and acylsilanes.

Typically, the photochemical decomposition products of cationic photoinitiators do not initiate the cationic polymerization directly. The decomposition products undergo further thermal reactions to produce the strong acid initiator, $H^+X^-$. For example, the iodonium cation produced from photodegradation of diaryliodonium salts does not initiate polymerization but the strong acid generated therefrom does. Free radicals are also formed during this process, which indicates that iodonium salts can simultaneously cure via a free radical mechanism and a cationic mechanism.

The nature of the anion of the strong acid has a dramatic effect on the rate and extent of cationic polymerization. Nucleophilic anions compete with the monomers for the active cations during the polymerization. Very weakly (non) nucleophilic anions are required as counter ions in successful photoinitiators. The counter ions in common commercial use today are, in order reactivity toward cationic polymerization for the same photoreactive cation, $SbF_6^- > AsF_6^- > PF_6^- > BF_4^-$.

The photoinitiator used may be a single compound, a mixture of two or more active compounds or a combination of two or more different initiating compounds, i.e., a cationic photoinitiator with a free radical initiator which forms part of a multi-component initiating system or two cationic photoinitiator or two free-radical photoinitiators. For example, a combination of diaryl iodonium cation and tetrakis(pentafluorophenyl)borate anion. Combinations of photoinitiators can be used to provide a dual cure or a single compound can provide a dual cure as in the case of the diaryliodonium salts discussed above.

The photoinitiator is preferably incorporated in an amount of from 0.01 to 10 wt. %, based on the total weight of the coating formulation, most preferably about 2 wt. % of the total coating formulation. When the amount of photoinitiator is too small, cure is insufficient and where an excessive amount is used, rapid cure results in a decrease in molecular weight.

A photosensitizer may be optionally be used with the photoinitiator in amounts of from 0.01 to 10 wt. %, based on the total weight of the coating formulation. The sensitizers modify the absorption spectrum of a photoinitiating package. Sensitizers absorb light and are promoted to an excited state and are then able to transfer this energy to another molecule, usually the photoinitiator. This, in turn, promotes the photoinitiator to an excited state and the photochemical reaction occurs as if the photoinitiator had been directly excited by a photon. The structure of the photosensitizer remains unchanged. Photosensitizers are often added to shift the light absorption characteristics of a system. An example of a photosensitizer for cationic polymerizations is anthracene, which is used with the diphenyliodonium cation. Other suitable examples of photosensitizers for cationic cures include anthracene, perylene, phenothiazine, xanthone, thioxanthone and benzophenone.

Optionally, a photopolymerization initiation assistant may also be used. This is an agent which is not activated itself by ultraviolet radiation but which, when used with a photopolymerization initiator, helps the initiator speed up the initiation of polymerization; thus, realizing a more efficient cure.

Conventional thermal initiators and those activated by moisture, air and/or electron beam radiation are suitable for use in this invention.

The proportion of thermoplastic resin binder, additives, wax, selectively curable monomers and oligomers, and polymers of selectively curable monomers and/or oligomers within the thermosoftenable coating can be adjusted to control the melt viscosity (cohesion), hot tack, softening temperature, resiliency and other properties such as the response of the thermosoftenable coating to a thermal transfer printer. These properties can also be adjusted by controlling the glass transition temperature (degree of polymerization) and the degree of crosslinking of the polymer formed from the selectively curable monomer and/or oligomer. Mixtures of monomers and oligomers can be used to modify the properties (Tg and crosslinking) of the resultant polymer. The structure of the polymer obtained can vary from a linear thermoplastic to polymers with increased crosslinking up to a highly crosslinked thermoset. Monofunctional monomers typically polymerize to form thermoplastic polymers, while multifunctional monomers or oligomers will form thermosets due to the larger number of reactive sites per polymerizing unit. Where a mixture of monofunctional monomers are used, random copolymers are formed. The glass transition temperature (Tg) of a linear copolymer can typically be varied by adjusting the ratio of monomers within a chain length. The glass transition temperature $Tg_R$ of a random copolymer can be predicted by the following equation:

$$\frac{1}{Tg_R} = W_1 \frac{1}{Tg_1} + W_1 \frac{1}{Tg_2}$$

wherein $W_1$ and $W_2$ are weight fractions of components 1 and 2, and $1/Tg_1$ and $1/Tg_2$ are the reciprocal values for glass transition temperatures of the respective homopolymers of each monomer. Typically, bulky, high molecular weight monomers generate polymers with higher glass transition temperatures.

If desirable, monofunctional, difunctional or multifunctional alcohols can be added to the thermosoftenable coating for incorporation into the backbone of the polymers formed to help control crosslinking and Tg. Multifunctional alcohols can provide crosslinking sites. Difunctional alcohols provide chain extension and monofunctional alcohols provide chain transfer and can serve to terminate polymer chains and control molecular weight. Short polymer chain lengths provided by the use of high levels of monofunctional alcohol during polymerization will reduce Tg values. Each growing polymer chain can be terminated by an alcohol. This forms an ether linkage and liberates a proton. This proton is free to initiate a new cationic chain reaction. The addition of alcohols into an epoxy cationic polymerization process increases the speed of reaction. This is attributed to the greater mobility of the proton as compared to the cations of the growing polymer chains. It is common practice to add a small amount of alcohol to a formulation to speed up the cationic reaction.

A number of alcohols are manufactured specifically for incorporation into cationically cured epoxies. Typical examples include the tone polyols, diethylene glycol, triethylene glycol, dipropylene glycol and polyether polyols. Mono- and difunctional alcohols having molecular weights in the range of 3,000 to 4,000 function very well in UV cationically cured systems. Such alcohols can form block copolymers with epoxy monomers. The difunctional alcohols form ABA block copolymers. With these large molecular weight alcohols, the cationic polymerizations of the epoxy monomers build on alcohol groups instead of on the epoxy groups.

The thermal transfer media of this invention are prepared from coating formulations that contain the above components preferably in aqueous solutions, dispersions or emulsions at about 10–60 wt. % solids, preferably 20–30 wt. % solids. Coating formulations based on organic solvents or which are free of solvent (hot melt) are also suitable. In forming the coating formulation, the resin components may be added to an attritor wherein the solids are ground to a particle size of less than 10 $\mu$m at temperatures not to exceed 120 F. Such particle sizes are typically obtained in about 2 hours at 200–250 rpm. Emulsifiers may be used to help prevent precipitation of one or more components. A common emulsion may also be prepared by melting and resolidifying all solid components in the presence of the same emulsifier or combination thereof.

Suitable emulsifiers include conventional resin emulsifiers and wax emulsifications available commercially and well known to those skilled in the art, examples of which include those available under the tradenames "Tween™", such as Tween™ 40, 60, 80", etc., "Surfynol", such as Surfynol 420, 440, 460", etc., "Morpholine", "Span", "Brig", "Triton", and propylene glycol. Mixtures of emulsifiers are preferred. One skilled in the art can readily determine whether a particular conventional emulsifier will emulsify the wax and/or thermoplastic resin selected by simply adding the emulsifier to fine particle dispersions of the wax and/or thermoplastic resin or forming such fine particles in the presence of emulsifier. The amount of emulsifier can vary widely and is preferably used in an amount of from 1 to 30 wt. % based on dry components.

The emulsions typically contain an aqueous solvent which can be essentially water, but may include a small portion of water miscible solvent such as an alcohol in an amount of less than 10 wt. %, based on the total liquid content. Examples include polypropylene glycol and N-propanol.

The thermal transfer media of the present invention can be prepared by the method of this invention which comprises coating a supporting substrate with a liquid coating formulation, which comprises: (1) a sensible material, (2) a wax and/or a thermoplastic binder resin and (3) an uncured monomer and/or oligomer which is selectively curable. The components of the coating formulation and proportions thereof are as described above for the thermosoftenable coating, based on solids. The liquid coating formulation may have a solvent carrier which is to be evaporated to provide a liquid state or it may be heated to a liquid state.

The coating formulations can be applied to substrates using conventional techniques and equipment such as a Meyer Rod® or like wire round doctor bar set up on a conventional coating machine to provide suitable coat weights. Where the uncured monomers/oligomers are photopolymerizable, the coating is preferably applied in darkness. The coat weight of the liquid coating as preferably maintained between about 1–5 g/m$^2$, based on solids.

The liquid coating is then dried or cooled to form a solid coating on the flexible substrate. The liquid coating on the flexible supporting substrate is preferably dried at a temperature of about 130° F.–250° F. where a solvent is present. Where the liquid coating formulation is a hot melt formulation, it is preferably cooled to ambient temperature.

The solid coating is then exposed to heat, air, moisture, visible light, U.V. light or electron beam radiation, depending on the uncured monomers, oligomers and initiators in the coating. Preferred methods expose the solid coating to UV or visible light to activate photoinitiators for the reaction of photopolymerizable monomers and/or oligomers within the solid coating.

Suitable light sources for curing the layer of coating formulation on the supporting substrate depend on the photoinitiator used. Those responsive to visible light can be cured by ambient light from conventional incandescent light bulbs, fluorescent light bulbs or sun light. Those photoinitiators responsive to the UV light can be activated by high and medium pressure mercury lamps, xenon-lamps, arc lamps and gallium lamps and the like.

Figure 3:
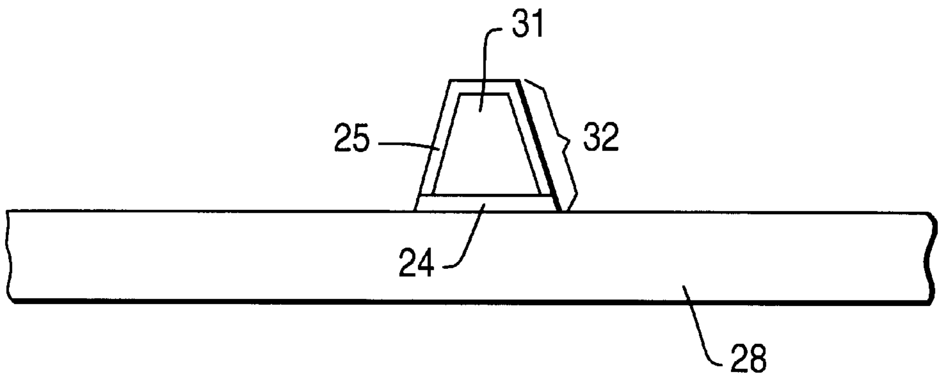
FIGS. 3 and 4 illustrate images formed by a thermal transfer medium of the present invention which have been further cured following transfer to a receiving substrate.
Figure 4:
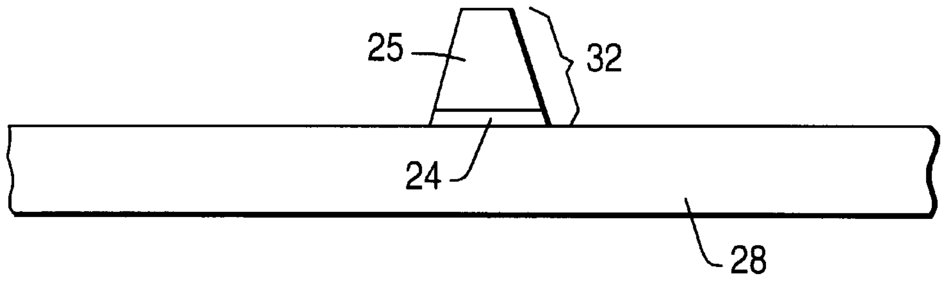

The thermosensitive coating can be fully transferred to a receiving substrate such as paper, including rough stock, or synthetic resin at a temperature in the range of 75° C.–300° C. The image formed can be further cured as shown in FIGS. 3 and 4. In FIG. 3, image 32 on substrate 28 comprises cured layer 24, uncured portion 31 and cured layer 25. Cured layer 25 is formed from uncured layer 26 shown in FIGS. 1 and 2. Cured layer 25 surrounds a remaining portion of uncured layer 26, which is uncured portion 31. In FIG. 4, image 32 comprises cured layer 24 and cured layer 25. In this embodiment, cured layer 25 is formed by completely curing uncured layer 26 of FIGS. 1 and 2.

The thermal transfer printers provided by this invention comprise a thermal transfer print head with heating elements which transfer ink from a thermal transfer ribbon to a receiving substrate, a ribbon feeder which feeds a thermal transfer ribbon to the heating elements of the thermal transfer print head and at least one thermal transfer ribbon positioned within the ribbon feeder, wherein the thermal transfer ribbon is a thermal transfer medium of this invention as described above.

In the foregoing and in the following examples, all temperatures are set forth in degrees Celsius; and, unless otherwise indicated, all parts and percentages are by weight.

The entire disclosure of all applications, patents and publications, cited above and below, are hereby incorporated by reference.

EXAMPLE 1

Coating Formulation

A coating formulation for use in the methods of the present invention is prepared by combining the following components. The photoinitiator is added last, preferably in darkness.

| Component | Function | Amount (wt. %) |
|---|---|---|
| Spectracure blue 15:3[1] | Pigment | 3→ 10 |
| Limonene Dioxide[2] | Epoxy monomer | 20→ 40 |
| UVR 6216[3] | Epoxy monomer | 15→ 35 |
| s-nauba[4] | Wax | 25→ 40 |
| Picotex 75[5] | Non-reactive resin | 0→ 20 |
| CD-1012[6] | Photonitiator | 1→ 8 |

[1]Spectracure Blue 15:3 Sun Chemical Corporation Pigments Division 411 Sun Avenue Cincinnati, OH 45232

[2]Limonene Dioxide Elf Atochem North America Specialty Epoxides 2000 Market Street Philadelphia, PA 19103

[3]Cyracure UVR-6216, 1,2-epoxyhexadecane Union Carbide Chemical and Plastics Company, Inc. Solvents and coatings Materials Division 39 Old Ridgebury Road Danbury, CT 06817-0001

[4]S-nauba Shamrock Technologies, Inc. Foot of Pacific St. Newark, NJ 07114

[5]Piccotex 75 Hercules Incorporated Hercules Plaza Wilmington, Delaware 19894

[6]CD-1012, Diaryliodonium Hexafluoroantimonate Sartomer Company, Inc. Oaklands Corporate Center 502 Thomas Jones Way Exton, Pennsylvania 19341

The resulting coating formulation has a solids content of 100%.

EXAMPLE 2

Thermal Transfer Medium

A film of the coating formulation of Example 1 is applied to a glass plate with a wood applicator and is exposed to ultraviolet light from a non-doped Mercury Arc lamp at an intensity of 300 watts/in for less than 3 seconds, while traveling 15–20 ft./min. in a U.V. cabinet from U.V. Process Supply Inc., 4001 North Ravenswood Avenue, Chicago, Ill. 60613. The top surface of the film is not tacky and shows good adhesion to the substrate.

The coating formulation can be applied to a polyester film at a coat weight conventional for functional layers to form a thermal transfer ribbon. This ribbon can be fed through a conventional thermal transfer printer operating at a conventional print head energy (2) and speed (2"/sec.) to produce bar codes of suitable resolution and integrity.

Peel Strength Analysis of TTR Coatings

1. Sample Preparation

A 1 inch wide and 10 inch long stripe is cut from a thermal transfer ribbon, which is manufactured by applying the coating identified onto a polyester film. The stripe is taped to smooth (bond) paper and then is pressed together in the press at about 250 C for 0.5 seconds so the coating from the ribbon is melted into the paper substrate.

| Test Conditions and Procedures | |
|---|---|
| Instrument: | Instron 4411 |
| Temperature: | 75° C. |
| Relative Humidity: | 50% |
| Test Speed: | 2 in/min. |
| Peel Angle: | 180° |

A test specimen is attached to the Instron by clamping the polyester film to one end and the paper substrate to another end. The film and the paper are separated at constant rate of 2 inch per minute at 180°. The force is recorded and the peel strength is calculated dividing this force by the sample width.

3. Test Results and Comparison

Peel strength is measured in gram/inch. The peel strength of a single coated general purpose ribbon comprising carbon black, carnauba wax, ethylene vinyl acetate resin and polyethylene wax measured by this techniques is 9 g/in.

VISCOSITY MEASUREMENT

The melt viscosity of a coating can be measured using a Haake RS 150 Rheometer at various shear rates. In such a device the melt viscosity of a single layer general purpose ribbon is measured as 1426 mPas, at 150° C. and a shear rate of 100 1/s.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A thermal transfer medium which transfers images to a receiving substrate when exposed to an operating print head of a thermal transfer printer, said thermal transfer medium comprising:

a) a flexible supporting substrate and b) a thermosensitive coating positioned on said substrate comprising a sensible material, uncured monomers and/or oligomers which are selectively curable and polymers of said selectively curable monomers and/or oligomers, wherein the polymers of the selectively curable monomers and/or oligomers are concentrated at the top of said coating to provide a cured region at the top surface of said coating and the uncured monomers and/or oligomers which are selectively curable are concentrated at the bottom surface of said coating which contacts the flexible supporting substrate; to provide a uncured region at the bottom surface of said coating, and wherein the total amount of uncured monomers and/or oligomers which are selectively curable, plus the amount of polymers of the selectively curable monomers and/or oligomers, falls within the range of from 10 to 70 wt. %, based on the dry components of said coating.

2. A thermal transfer medium as in claim 1, wherein the melt viscosity of the cured region is at least 2 times greater than that of the uncured region.

3. A thermal transfer medium as in claim 2, wherein the uncured region and cured region are to provide an uncured layer and cured layer within said coating.

4. A thermal transfer medium as in claim 3, wherein the cured layer comprises from 10 to 60 wt. % of said coating and said cured layer has hot tack properties, as quantified by peel strength values in gms/in, at least 10 times greater than the hot tack properties of the uncured layer.

5. A thermal transfer medium as in claim 3, wherein the coating further comprises from 5 to 50 wt. % thermoplastic binding resin, from 10 to 60 wt. % wax, and from 5 to 25 wt. % sensible material, each based on dry components.

6. A thermal transfer medium as in claim 2, wherein the cured region of said coating has hot tack properties, as quantified by peel strength values in gms/in, at least 10 times higher than the hot tack properties of the uncured region.

7. A thermal transfer medium as in claim 1, wherein the selectively curable monomer is a UV or visible light cured photopolymerizable monomer, oligomer or mixture thereof.

8. A thermal transfer medium which transfers images to a receiving substrate when exposed to an operating print head of a thermal transfer printer, said thermal transfer medium comprising:

a) a flexible supporting substrate and b) a thermosensitive coating positioned on said substrate comprising a sensible material, uncured monomers and/or oligomers which are selectively curable, polymers of said selectively curable monomers and/or oligomers and at least one wax, thermoplastic binding resin or both, wherein the polymers of the selectively curable monomers and/or oligomers are concentrated at the top surface of said coating and form a cured layer at the top surface of said coating and the uncured monomers and/or oligomers which are selectively curable are concentrated at the bottom surface of said coating which contacts the flexible supporting substrate and form an uncured layer at the bottom surface of said coating;

wherein the melt viscosity of the cured layer is at least 2 times greater than that of the uncured layer; and wherein the total amount of uncured monomers and/or oligomers which are selectively curable, plus the amount of polymers of the selectively curable monomers and/or oligomers, falls within the range of from 10 to 70 wt. %, based on the dry components of said coating.

9. A thermal transfer medium as in claim 8, wherein the cured layer has hot tack properties which correspond to a peel strength of 18–125 gms/in where used to bond a polyester film to paper at 250° C. for 0.5 second as measured on an Instron 4411 at 75° C., 50% relative humidity, at a test speed of 2 in./minute and peel angle of 180°.

10. A thermal transfer medium as in claim 8, wherein the selectively curable monomers are selected from those which are cured by exposure to heat, moisture, air, electron beam (EB) radiation, visible (ambient) light and/or UV-light.

11. A thermal transfer medium as in claim 8, wherein the selectively curable monomers are selected from the group consisting of thermally curable epoxies, UV curable epoxies, moisture curable epoxies, UV curable vinyl ethers, UV curable acrylic monomers and moisture curable combinations of diisocyanate and diols that form polyurethanes.

12. A thermal transfer medium as in claim 8 wherein are in the thermoplastic binder resin is selected from the group consisting of ethylene-vinylacetate copolymers, polyesters, polyurethanes and styrene-butadiene block copolymers.

13. A thermal transfer ribbon as in claim 8, wherein the melt viscosity of the uncured layer is 25 to 1,500 mPas at 150° C. and a shear rate of 100 l/s.

14. A thermal transfer medium which transfers images to a receiving substrate when exposed to an operating print head of a thermal transfer printer, said thermal transfer medium comprising:

a) a flexible substrate and b) a thermosensitive coating positioned on said substrate comprising:

i) a cured layer, positioned at the top surface of said coating, comprising polymers of photopolymerizable monomers, oligomers or mixtures thereof;

ii) a cured layer, positioned at the bottom surface of said coating which contacts the flexible supporting substrate, comprising photopolymerizable monomers, oligomers or mixtures thereof;

iii) at least one photoinitiator which will initiate polymerization of the photopolymerizable monomer, oligomer or mixture thereof, when exposed to UV radiation of visible light;

iv) at least one wax;

v) at least one thermoplastic binder resin; and vi) at least one sensible material;

wherein the cured layer comprises 10–60 wt. % of said coating.

15. A thermal transfer medium as in claim 14, wherein the thermoplastic binder resin is reacted with a photopolymerizable monomer or oligomer within said coating.

16. A thermal transfer medium as in claim 14 which comprises an amount of wax within the range of 5 wt. % to 60 wt. %, an amount of thermoplastic binder resin within the range of 5 wt. % to 50 wt. % and an amount of sensible material in the range of 5 wt. % to 25 wt. %, based on total solids of said coating.

17. A thermal transfer medium as in claim 14, wherein the photoinitiator is a cationic photoinitiator selected from aryldiazonium salts, diaryliodonium salts, triarylsulphonium salts, triarylselenium salts, dialkylphenylacylsulphonium salts, aryloxydiarylsulphoxonium salts and diarylphenacylsulphoxonium salts.

18. A thermal transfer medium as in claim 14 which additionally contains thermal polymerization initiators and at least one monomer, oligomer or mixture thereof which is polymerizable by said thermal polymerization initiators.

19. A thermal transfer medium as in claim 14, wherein the UV or visible light cured photopolymerizable monomer, oligomer or mixture thereof is selected from the group consisting of epoxies, cyclic ethers, vinyl ethers, acrylates, acrylic acids, methacrylates and methacrylic acids.

20. A thermal transfer medium as in claim 19, wherein the photopolymerizable monomers and oligomers are selected from the group consisting of:

(a) monofunctional monomers selected from the group consisting of cycloaliphatic monoepoxies, epoxidized alpha olefins, limonene monoxide and epoxidized polybutadiene;

(b) bifunctional monomers and oligomers selected from the group consisting of bis(3,4-epoxycyclohexyl) adipate, limonene dioxide, bisphenol-A epoxy and 3,4-epoxycyclohexylmethyl-3,4-epoxycyclohexane carboxylate; and (c) polyfunctional monomers and oligomers selected from the group consisting of epoxidized soybean oil and linseed fatty acid esters.

21. A thermal transfer medium as in claim 14, wherein the cured layer is derived from at least two UV or visible light cured photopolymerizable monomers or oligomers.

22. A thermal transfer medium as in claim 14, wherein the cured layer comprised of polymers derived from UV or visible light cured photopolymerizable monomers, oligomers or mixtures thereof contains crosslinks provided by a member selected from the group consisting of multifunctional alcohols, epoxies, vinyl ethers, acrylates, methacrylates, acrylic acids and methacrylic acids.

23. In a thermal transfer printer which comprises a thermal transfer print head with heating elements which transfer ink from a thermal transfer ribbon to a receiving substrate, a ribbon feeder which feeds a thermal transfer ribbon to the heating elements of a thermal transfer print head and at least one thermal transfer ribbon positioned within the ribbon feeder, the improvement comprising employing a thermal transfer ribbon of claim 1.

24. A thermal transfer printer which comprises a thermal transfer print head with heating elements which transfer ink from a thermal transfer ribbon to a receiving substrate, a ribbon feeder which feeds a thermal transfer ribbon to the heating elements of the thermal transfer print head and at least one thermal transfer ribbon positioned within the ribbon feeder, said thermal transfer ribbon comprising:

a) a polyester substrate and b) a thermosensitive coating positioned on said polyester substrate comprising i) a cured layer, positioned at the top surface of said coating, comprising polymers of photopolymerizable monomers, oligomers or mixtures thereof;

ii) an uncured layer, positioned at the bottom surface of said coating which contacts the polyester substrate, comprising photopolymerizable monomers, oligomers or mixtures thereof;

iii) at least one photoinitiator which initiates polymerization of the photopolymerizable monomer, oligomer or mixture thereof, when exposed to UV radiation of visible light;

iv) at least one wax;

v) at least one thermoplastic binder resin; and vi) at least one sensible material;

wherein the cured layer comprises 10–60 wt. % of said coating; and wherein the uncured layer has a melt viscosity in the range of 25 to 1,500 mPa at 150° C. at a shear rate of 100 l/s on a Brookfield viscometer (spindle #2), and the cured layer has a melt viscosity in the range of 5,000 to 30,000 mPas at 150° C. at a shear rate of 100 l/s on a Brookfield viscometer (spindle #4).

25. A method for producing a thermal transfer ribbon which comprises:

(a) depositing a liquid coating formulation on a supporting substrate to form a liquid coating thereon, said coating formulation comprising i) a sensible material, ii) at least one of a wax or a thermoplastic binder resin, iii) an uncured monomer, oligomer or combination thereof which is selectively curable, in an amount of 10–70 wt. % based on the total solids of said coating formulation, and iv) optionally a solvent;

(b) forming a solid coating from the liquid coating by either drying the liquid coating to remove solvent or cooling the liquid coating to ambient temperature; and (c) curing the top portion of the solid coating by selectively polymerizing the uncured monomer therein such that the cured top portion of the coating comprises 10–60 wt. % of the total coating.

26. A method as in claim 25, wherein the selectively curable monomer is a photopolymerizable monomer, oligomer or mixture thereof which will polymerize when exposed to UV light or visible light.

27. A method as in claim 25, wherein the top portion of the solid coating is cured by exposure to UV light for less than 3 seconds, at an intensity of 300 watts per inch.

* * * * *

UNITED STATES PATENT AND TRADEMARK OFFICE

CERTIFICATE OF CORRECTION

PATENT NO. : 6,040,040
DATED : March 21, 2000
INVENTOR(S) : David J. Rainbow

It is certified that error appears in the above-identified patent and that said Letters Patent is hereby corrected as shown below:

Column 29,
Line 34, after "ii) a" delete "cured" and insert -- uncured --.

Signed and Sealed this

Eleventh Day of September, 2001

Attest:

Nicholas P. Godici

NICHOLAS P. GODICI

*Attesting Officer* *Acting Director of the United States Patent and Trademark Office*